United States Patent
Vogl et al.

(10) Patent No.: US 6,413,164 B1
(45) Date of Patent: Jul. 2, 2002

(54) TORSIONALLY RIGID, PLAY-FREE, FLEXIBLE METAL BELLOWS-TYPE COUPLING FOR THE TORQUE-TRANSMISSIVE CONNECTION OF TWO SHAFTS

(75) Inventors: Norbert Vogl, Rott; Johann Eberle, Irsee, both of (DE)

(73) Assignee: Chr. Mayr GmbH & Co. KG, Mauerstetten (DE)

( * ) Notice: Subject to any disclaimer, the term of this patent is extended or adjusted under 35 U.S.C. 154(b) by 0 days.

(21) Appl. No.: 09/623,336

(22) PCT Filed: Mar. 19, 1999

(86) PCT No.: PCT/EP99/01857
§ 371 (c)(1),
(2), (4) Date: Aug. 31, 2000

(87) PCT Pub. No.: WO99/47827
PCT Pub. Date: Sep. 23, 1999

(30) Foreign Application Priority Data

Mar. 19, 1998 (DE) ............................................ 198 12 223

(51) Int. Cl.⁷ ................................................. F16D 3/50
(52) U.S. Cl. ............................................................ 464/79
(58) Field of Search ........................ 464/79, 80; 29/454; 403/51; 92/34, 45; 285/226; 411/522, 530

(56) References Cited

U.S. PATENT DOCUMENTS

| 3,635,049 | A |   | 1/1972  | Schlotmann et al. |
| 3,677,031 | A |   | 7/1972  | Zierak et al. |
| 3,707,082 | A | * | 12/1972 | Ulics ........................... 464/79 X |
| 4,560,142 | A | * | 12/1985 | Burton ..................... 411/530 X |
| 4,708,558 | A | * | 11/1987 | Musil ....................... 411/530 X |
| 5,049,158 | A |   | 9/1991  | Engelhardt et al. |
| 5,299,980 | A |   | 4/1994  | Agius |
| 6,312,021 | B1| * | 11/2001 | Thomas .................. 285/226 X |

FOREIGN PATENT DOCUMENTS

| DE | 929402  |   | 6/1955 |         |
| DE | 4031486 |   | 4/1992 |         |
| DE | 4217765 |   | 2/1993 |         |
| EP | 0534926 |   | 3/1993 |         |
| GB | 543733  | * | 3/1942 | ........ 411/530 |

* cited by examiner

Primary Examiner—Greg Binda
(74) Attorney, Agent, or Firm—Ladas & Parry

(57) ABSTRACT

The invention relates to a torsionally rigid, play-free, metal bellows-type, flexible shaft coupling for the torque-transmissive interconnection of two shafts. A metal bellows (1) has its generally axially flanged-out ends (1') clamped on the ends of shafts (4) for frictional engagement. For the provision of a torsionally rigid, torsionally play-free and flexible coupling which can be manufactured inexpensively, which is readily available due to a modular design and which does not affect the drive train dynamics, the ends (1') of metal bellows (1) have clamping rings (2, 2a) placed thereon which have slots (2') therein and are adapted to be compressed by the width of slot (2') to preferably directly clamp the ends (1') of metal bellows (2) down on shafts (4).

26 Claims, 4 Drawing Sheets

TORSIONALLY RIGID, PLAY-FREE, FLEXIBLE METAL BELLOWS-TYPE COUPLING FOR THE TORQUE-TRANSMISSIVE CONNECTION OF TWO SHAFTS

FILED OF THE INVENTION

The invention relates generally to a torsionally rigid, play-free, metal bellows-type flexible coupling for the torque-transmitting connection of two shafts, and more specifically to such a coupling capable of providing a rigid, play-free coupling between two shaft ends in which the shaft diameters may be of different sizes.

BACKGROUND ART

For connecting the metal bellows with the input and output shafts so that no torsional play can exist, the state of the art calls for two interfaces or joints, namely, one between the bellows and a hub and the other between that hub and the shaft. One drawback of the prior interfaces or joints is that they cannot be separated in a non-destructive manner—such as welds provided in accordance with a variety of processes, joints using one, two or more adhesive bonds, or beads and flanges. For the second interface or joint between the hub and the shaft, conical connections, shrink washers, collets or radially clamping hubs have been used in the past.

In the prior bellows-type couplings, the necessity of providing two interfaces or joints causes the following drawbacks: high cost of fabrication, insufficient flexibility when adapting the coupling to the customers' interface or connecting positions, and a high mass inertia due to the great number of components.

SUMMARY OF THE INVENTION

Where it is necessary to quickly provide a low-cost, torsionally rigid, elastic compensating coupling, an ideal coupling design would have to have the following advantages:

Combination of the two interfaces or joints to form one interface or joint; modular construction; adaptability to compensate existing shaft misalignment by simple replacement of the torque-transmitting metal bellows; torsionally play-free design; high torsional rigidity; low rigidity to displacement; low mass moment of inertia.

In order to obtain all the aforesaid advantages, the object underlying the invention is seen in the provision of a metal bellows-type compensating coupling which is inexpensive to manufacture, is modular to enhance its availability, is torsionally rigid and torsionally play-free and elastic, and in the installed condition does not substantially affect drive train dynamics.

This object is achieved by means of the characterizing features specified in the description below.

The principle underlying the invention is the functional combination of the frictional connections between the bellows and the hub and between the hub and the shaft to form a single joint, with the cylindrical or inwardly slightly tapered end of the bellows frictionally engaged with the input and output shaft directly or indirectly by means of an external clamping unit.

DISCUSSION OF THE PRIOR REFERENCES

East German patent DD 147 742 discloses a metal bellows-type coupling in which the end of the metal bellows is flanged out in a generally axial direction (slightly tapered or cylindrical with a crimp) and is placed over a hub on the shaft. An external member not described in detail is used to clamp the end down on the hub and thus on the shaft.

DE-A-42 17 764 shows a metal bellows-type coupling in which a radially slotted clamping ring—compressible by the width of the slot—is used to clampingly engage the metal bellows with the shafts. The manner of connecting the metal bellows with the clamping ring is not described in detail; also, it engages the shaft directly.

According to the disclosure of U.S. Pat. No. 3,232,076, a metal bellows-type coupling is provided with a metal bellows axially cylindrically flanged out at its ends, said ends being introduced in recesses machined in internally tapered threaded sleeves. These sleeves receive external nuts which are oppositely tapered internally. The tapered bores receive an axially slitted double cone surrounding the shaft. Tightening the nut causes the double cone to be compressed radially and to be clamped down on the shaft.

The metal bellows coupling of U.S. Pat. No. 4,645,473 comprises a metal bellows with cylindrically flanged ends each seated on a ring. Adjoining the rings are axially hollow, longitudinally slitted sleeves having tapered outer threads thereon, said rings being placed on the shafts; tightening the threaded sleeves will radially compress them to clamp the metal bellows onto the shaft.

The journal "Antriebstechnik" 1997, issue no. 10, page 88, discloses a metal bellows-type coupling comprising a unit assembled of the metal bellows and a hub adhesively bonded thereto, said unit being placed on a hub connected with the shaft.

BRIEF DESCRIPTION OF THE DRAWINGS

The following text describes exemplary embodiments of the invention, making reference to the attached drawings.

DETAILED DESCRIPTION OF THE PREFERRED EMBODIMENTS

Figure 1:
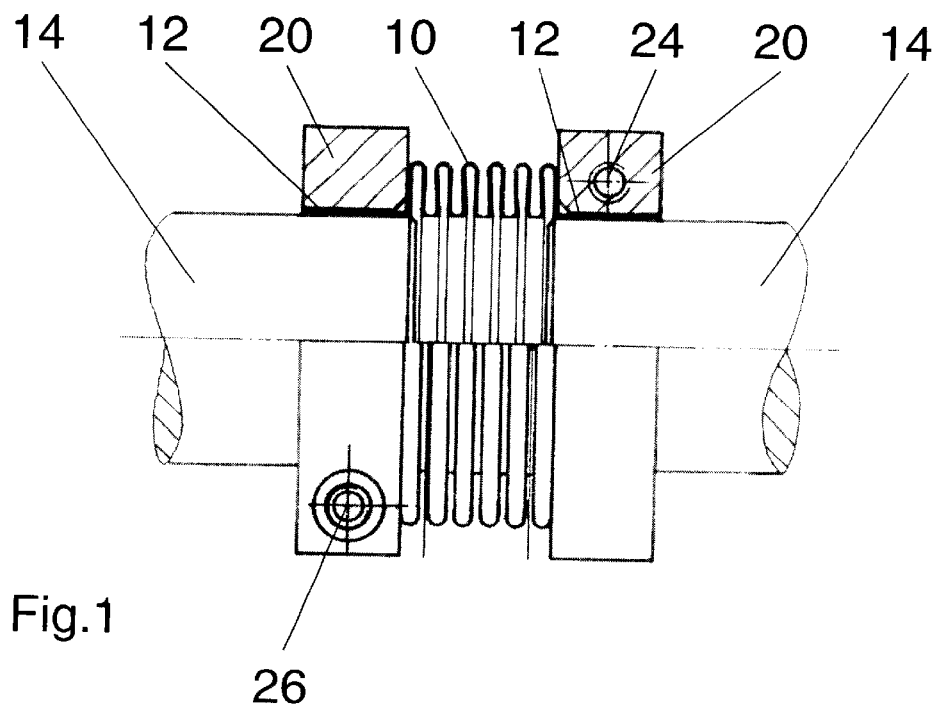
FIG. 1 shows a longitudinal section of a first embodiment of the invention.

As shown in FIG. 1, two shafts 14 are interconnected at their ends for torque transmission by means of a metal bellows 10. To this end, metal bellows 10 has flanged-out ends 12 to frictionally engage shafts 14. Flanged-out ends 12 may be cylindrical or slightly inwardly conical or tapered, and they may include optional longitudinal slits therein. The first embodiment is recommended for use on cylindrical ends 12 the second on slightly inwardly conical ends 12; the last-mentioned shape enhances the frictional engagement.

Figure 1A:
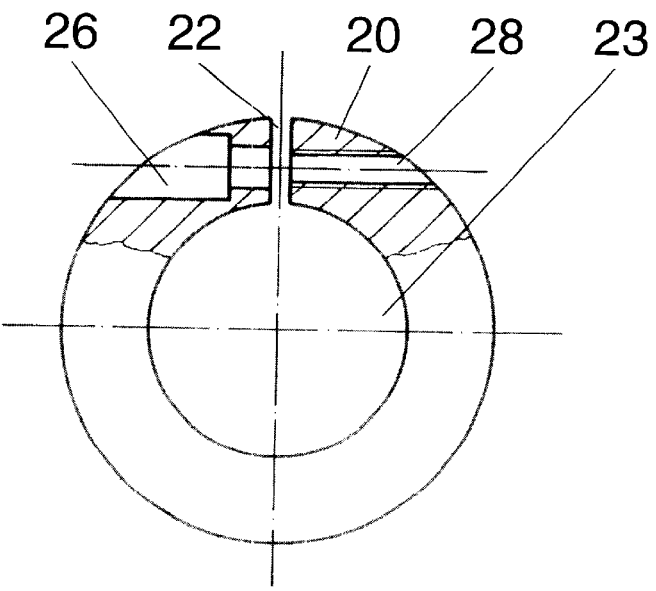
FIG. 1a shows-partially in section an associated clamping ring.

Ends 12 of metal bellows 10 are clamped down on shafts 14 by external clamping means, which are shown here to comprise clamping rings 20. As shown in FIG. 1a, clamping ring 20 includes a central bore 23, and is radially slotted at a desired position and can be compressed by the width of slot 22. Preferably the slot 22 is slightly wider than is necessary to enable the required compression to allow for wear, for oval deformation of the clamping ring 20, and for slightly differing shaft diameters.

Clamping ring 20 comprises a suitably flexible elastic or resilient material, preferably a metal, such as spring steel. Compression is effected by a clamping screw 24 disposed in aligned bores in the two ends of the clamping ring 20, with the cylindrical bore 26 receiving the head and an internally threaded bore 28 receiving the threaded portion of the clamping screw 24. This ensures a torque-transmitting frictional engagement of metal bellows 10 with the ends of shafts 14.

Figure 2:
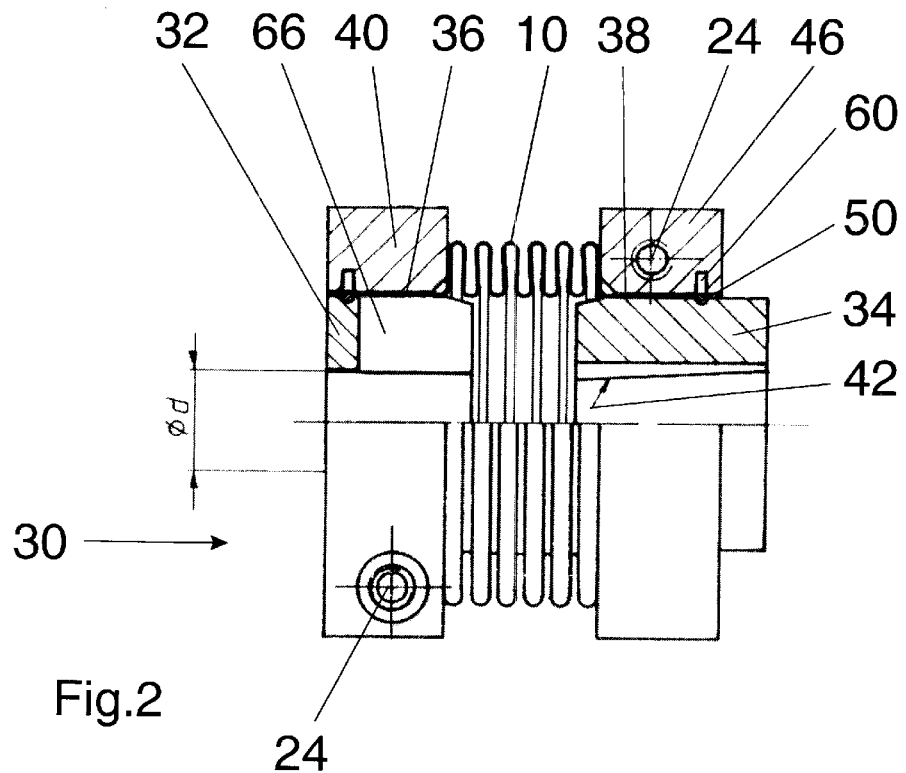
FIG. 2 shows a longitudinal section of a second embodiment of the invention.

FIG. 2 shows an embodiment of the invention 30 particularly suited for the coupling of shafts of different diameters. It also has the ability to couple parallel shafts to conical shafts (not shown in FIG. 2) by the use, respectively, of reducing sleeves 32, 34 disposed between the shafts and the flanged out ends 36, 38 of the metal bellows 10. The coupling of FIG. 2 has at its left end a reducing sleeve 32 which is shown in more detail in FIGS. 4a and 4b to make up the difference in diameter between the flanged out end 36 and a parallel shaft (not shown) entering the coupling 30 of FIG. 2 from the left-hand side. The left-hand flanged out end 36 of the metal bellows 10 is clamped down onto the reducing sleeve 32 by a clamping ring 40, which is tightened in the manner described with reference to the embodiment of FIG. 1. If it is desired to join two parallel shafts, then both the right and the left-hand end of the coupling shown in FIG. 2 can have similar reducing sleeves 32. Reducing sleeves 32, 34 of different internal diameters can enable the coupling of parallel shafts of different diameters.

Figure 4B:
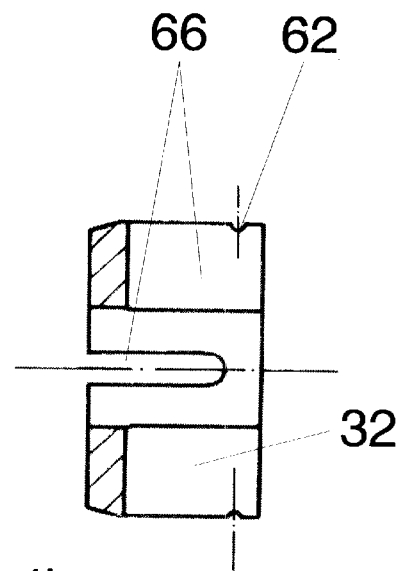
Figure 5A:
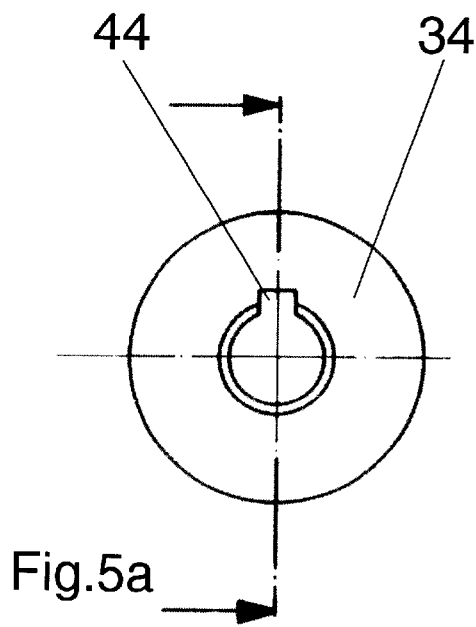
FIGS. 5a and 5b respectively, show a second embodiment of a reducing sleeve for tapered shafts.
Figure 5B:
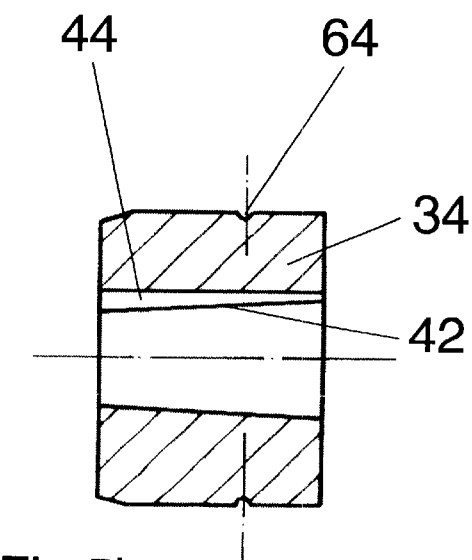

The right-hand end of the coupling shown in FIG. 2 has a reducing sleeve 34 with a conical inner bore 42, more clearly shown in FIGS. 5a and 5b. Such a bore 42 can typically be a "morse" taper or have a key way 44 as shown in FIGS. 5a and 5b. The flanged out end 38 of the metal bellows 10 at the right-hand end of FIG. 2 is clamped down onto the reducing sleeve 34 by means of a clamping ring 46 which can be tightened in the same way as the embodiment shown in FIG. 1. In this case however, the shaft (not shown) entering from the right-hand side of the coupling 30 in FIG. 2 is secured in the conical bore 42 by virtue of the cone and therefore the clamping force does not need to be communicated through the reducing sleeve 34. The reducing sleeve 34 thus effectively becomes part of the shaft 14. Each of the clamping rings 40, 46 shown in FIG. 2 has within its bore 23 and positioned near to the end face, an annular groove 60. This groove 60 aligns with a corresponding groove 62, 64 (FIGS. 4b, 5b) in the reducing sleeve 32, 34 and together hold a spring clip 50 (also shown in FIG. 6), which extends into the central bore 23 and is received in radial inner groove 60 in the clamping ring for radially fixing the clamping ring and reducing sleeve in place, and serves to prevent axial movement of the reducing sleeve 32, 34 with respect to the clamping rings 40, 46 before the clamping rings 40, 46 are tightened down.

Figures 3A, 3B:
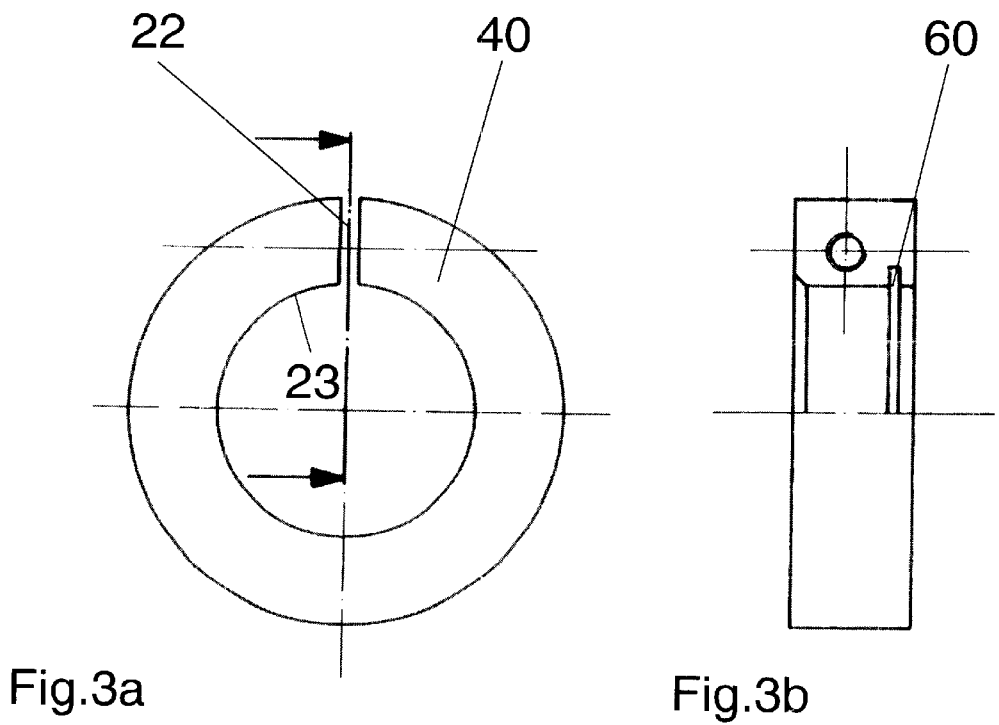
FIGS. 3a and 3b respectively, show a plan view and a side view partially in section of an associated clamping ring.

FIGS. 3a and 3b show a clamping ring either ring 40 or ring 46, in more detail. The arrangement for tightening the clamping ring is however not shown in the left-hand diagram of FIG. 3a, but is the same as the arrangement shown in FIG. 2. The right-hand diagram of FIG. 3b shows the radial extending annular groove 60 for reception of the retaining spring clip 50 disposed close to the right-hand outerface of the clamping ring 46. The inner face is provided with an internal bevel to clear the radius where the flanged out end 38 of the metal bellows 10 merges into the central bellows section.

Figure 4A:
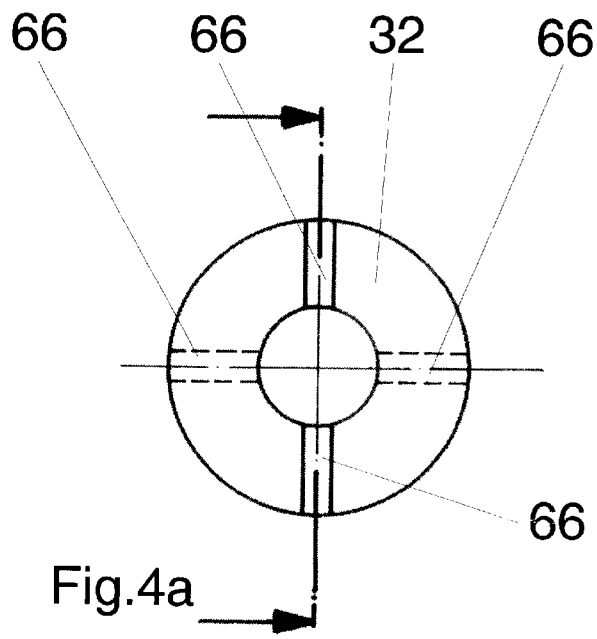
FIGS. 4a and 4b respectively, show a first embodiment of a reducing sleeve for cylindrical shafts.

FIGS. 4a and 4b show in more detail the reducing sleeve 32. This has a central bore for receiving the parallel shaft and axially extending lots 66. These slots 66 are disposed at 90° spacing around the circumference of the sleeve 32 and extend into the bore. They are machined alternately from opposing end faces of the sleeve 32. The slots 66 provide a radial resilence enabling force exerted by the clamping ring 40 to be transmitted through to the cylindrical shaft (not shown) thus holding the entire assembly rigid. This clamps the flanged out ends 36 (FIG. 2) of the metal bellows 10 between the clamping ring 40 and the reducing sleeve 32 and between the reducing sleeve 32 and the cylindrical shaft (not shown). An annular groove 62 (FIG. 4b) is shown in the cylindrical outer surface of the reducing sleeve 32 to accept the retaining spring clip 50 shown in FIG. 6.

As shown in FIGS. 5a and 5b, there is provided an internally conical reducing sleeve 34 with an internal key way 44 for securing on shaft 14 (FIG. 1); a radially extending circumferential groove 64 is machined in the external diameter in order to receive and hold retaining spring clip 50 (FIG. 6) in place.

Figure 6:
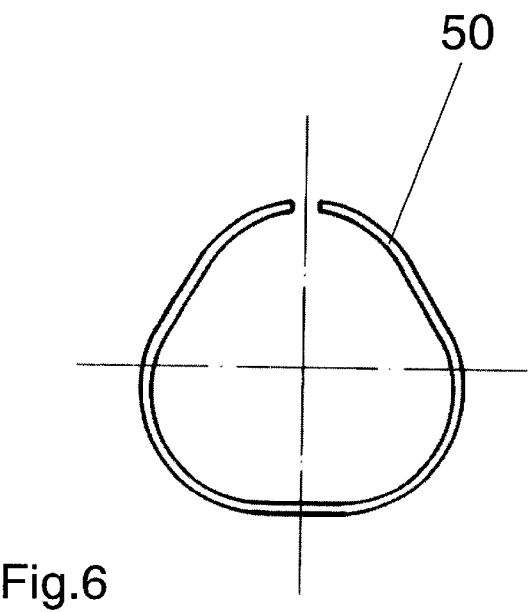
FIG. 6 shows a retaining spring.

FIG. 6 shows the retaining spring clip 50, which preferably is polygonal in shape. It may be made of spring steel wire. The spring clip 50 is triangular, but square or pentagonal springs are also possible. The polygonal shape helps concentrate the force of the spring onto distinct sections of the spring, i.e., the center of the sides, and leaves corners of the spring protruding from groove 60 (FIG. 3) for ease of assembly, disassembly and engagement with the slot in the clamping ring. The presence of the spring clip 50 gives rise to a snap action as the device is assembled. This assures the operator that the assembly is in a position for tightening.

An alternative arrangement to the clamping rings 40 and 46 described with respect to FIGS. 1 and 2 is to use a commercially available shrink washer (not shown), which directly clamps the ends 36, 38 of the metal bellows 10 down onto the shafts 14.

Figure 7:
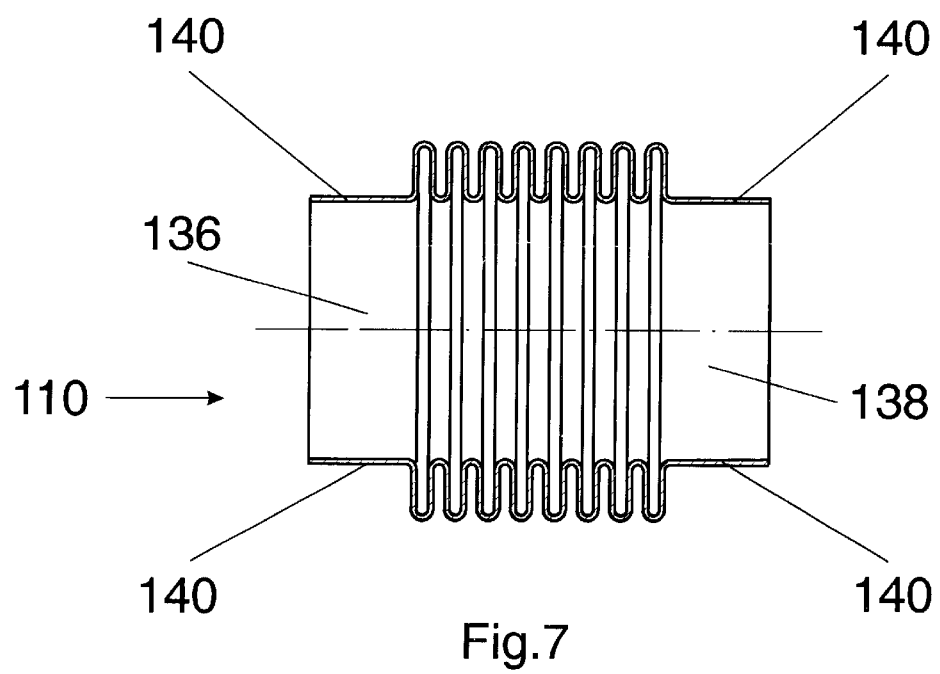
FIG. 7 is a cross-sectional view of a metal bellows according to the present invention prior to insertion into a clamping ring.

FIG. 7 is a cross-sectional view of a metal bellows 110 according to the present invention prior to it insertion into a clamping ring. Metal bellows 10 includes flanged out ends 136, 138, one at either axial end of the metal bellows, similar to metal bellows 10 of FIGS. 1 and 2. Flanged out ends 136, 138 each have at least one, and preferably two axial slots 140 so as to permit some radial flexure to the flanged out ends 136, 138. Flanged out ends 136, 138 in this embodiments has a shape that is slightly inwardly conical, shown in greatly exaggerated from in FIG. 1, so that the surface of the flanged out ends 136, 138 converge toward the centerline in the direction of the metal bellows.

What is claimed is:

1. A torsionally rigid, play-free, flexible, metal bellows-type coupling for the torque-transmitting interconnection of two shafts, said coupling including metal bellows having generally axially flanged-out ends, each end clamped down by a clamping ring having a bore for providing frictional engagement between the flanged-out ends and the respective shafts, including an easily interchangeable reducing sleeve disposed between at least one flanged-out end of said metal bellows and at least one of the shafts to compensate for differences in diameter between at least one flanged-out end and shaft, thereby rendering said coupling capable of accommodating shafts having different end diameters.

2. A coupling according to claim 1, wherein the reducing sleeve has axially extending slots machined in the end faces thereof.

3. A coupling according to claim 2, wherein said axial slots start alternatingly in the left hand and in the right hand end faces of said reducing sleeve.

4. A coupling according to claim 1, wherein the reducing sleeve is shaped and configured for securing on the shaft by means of a conical bore.

5. A coupling according to claim 1, wherein the ends of said bellows are clamped down on the external diameter of reducing sleeve to effect frictional engagement therewith.

6. A coupling according to claim 5, including a shape-locked, torsionally rigid connection of one end of said bellows with the outer diameter of reducing sleeve in addition to the frictional engagement therebetween.

7. A coupling according to claim 1, wherein the at least one flanged-out end of said metal bellows is shaped to have a generally cylindrical or a slightly inwardly conical form.

8. A coupling according to claim 1, wherein the at least one flanged-out end of the bellows has no recesses therein.

9. A coupling according to claim 1, wherein the at least one flanged-out end of the bellows has axial slots therein.

10. A coupling according to claim 1, including an urging device consisting of a clamping screw tangentially introduced in corresponding aligned bores formed in the clamping ring.

11. A coupling according to claim 1, wherein said clamping ring and reducing sleeve are axially secured in place by snap-in detent locking means, portions of said locking means being shaped and adapted to integrally engage said clamping ring with said reducing sleeve.

12. Coupling according to claim 1, wherein said reducing sleeve is configured to allow clamping said shaft end.

13. Coupling according to claim 12, wherein said reducing sleeve includes at least one axially extending slot.

14. A torsionally rigid, play-free, flexible, metal bellows-type coupling for the torque-transmitting interconnection of two shafts, said metal bellows having at least one generally axially projecting, flanged-out end clamped down by a clamping ring for frictional engagement on the ends of the shafts, including a reducing sleeve introduced between the metal-bellows flanged-out end and at least one of the shafts to compensate for differences in diameter between the flanged-out end and shaft wherein said reducing sleeve is secured in place by means of retaining springs.

15. A torsionally rigid, play-free, flexible, metal bellows-type coupling for the torque-transmitting interconnection of two shafts, said metal bellows having a generally axially flanged-out end clamped down by a clamping ring for frictional engagement on the ends of the shafts, said clamping ring having a central bore, including a reducing sleeve introduced between the metal-bellows flanged-out end and at least one of the shafts to compensate for differences in diameter between the flanged-out end and shaft wherein said reducing sleeve is secured in place by means of retaining springs, including a retaining spring received in a radial inner groove in said clamping ring for radially fixing the clamping ring and reducing sleeve in place.

16. A coupling according to claim 15, wherein the retaining spring in said clamping ring has portions radially projecting from said groove into the centered bore of said clamping ring.

17. A coupling according to claim 15, wherein said reducing sleeve has in the outer diameter thereof a groove to receive said retaining spring in a snap fit.

18. A coupling according to claim 15, wherein said retaining spring has the shape of an n-sided polygon.

19. A coupling according to claim 18, wherein said retaining spring has the shape of a three-sided polygon.

20. A coupling according to claim 15, wherein said retaining spring is a wire part bent to a desired shape.

21. A torsionally rigid, play-free, flexible metal bellows-type coupling for torque-transmitting interconnection of two shafts having different pre-determined diameters, said coupling comprising:
   a) at least one clamping ring having an inner diameter;
   b) a metal bellows having generally axially flanged-out ends, at least one of said ends being adapted to be clamped by a radially inwardly directed force provided by said clamping ring, said at least one of said ends having an outer diameter essentially corresponding to the inner diameter of said clamping ring; and
   c) at least one reducing sleeve having an outer diameter surface and an inner diameter surface, said reducing sleeve being capable of insertion within at least one of said metal bellows flanged-out ends so as to provide frictional engagement between said at least one metal bellows flanged-out end and said reducing sleeve outer diameter surface, and said inner diameter surface being capable of receiving an end of a shaft, the inner diameter of said reducing sleeve inner diameter essentially corresponding to the shaft diameter, such that the clamping ring, when clamped, causes frictional engagement of the at least one metal bellows flanged-out end by applying a radially inwardly directed force to the reducing sleeve outer diameter surface and further causes frictional engagement of said reducing ring inner diameter surface to a shaft extending in to the reducing sleeve.

22. A coupling according to claim 21, wherein the reducing sleeve has axially extending slots machined in the end faces thereof.

23. A coupling according to claim 22, wherein said axial slots start alternatingly in the lefthand and in the righthand end faces of said reducing sleeve.

24. A torsionally rigid, play-free, flexible, metal bellows-type coupling for the torque-transmitting interconnection of two shafts, said coupling including metal bellows having a generally axially flanged-out end clamped down by a clamping ring for frictional engagement on the ends of the shafts, including a reducing sleeve selected from a set of reducing sleeves having identical outer diameters, said set of reducing sleeves having different inner diameters that can accommodate different predetermined shaft diameters, said reducing sleeve being disposed between the flanged-out end of said metal bellows and at least one of the shafts to compensate for differences in diameter between the flanged-out end and the shaft, thereby rendering said coupling capable of accommodating, shafts of different diameters.

25. A coupling according to claim 24, wherein the reducing sleeve has axially extending slots machined in the end faces thereof.

26. A coupling according to claim 25, wherein said axial slots start alternatingly in the lefthand and in the righthand end faces of said reducing sleeve.

* * * * *